(12) United States Patent
Moore et al.

(10) Patent No.: US 7,211,742 B2
(45) Date of Patent: May 1, 2007

(54) FIRE RESISTANT, FORCED AIR COOLED ENCLOSURE FOR COMPUTER DIGITAL DATA STORAGE DEVICE

(75) Inventors: Robby Jay Moore, Auburn, CA (US); Jeffrey Bart Abramson, Los Gatos, CA (US); John Arthur Hendricks, Toledo, OH (US)

(73) Assignee: Auburn I.P. Holdings, LLC, Palo Alto, CA (US)

( * ) Notice: Subject to any disclaimer, the term of this patent is extended or adjusted under 35 U.S.C. 154(b) by 0 days.

(21) Appl. No.: 11/112,552

(22) Filed: Apr. 22, 2005

(65) Prior Publication Data

US 2005/0286225 A1 Dec. 29, 2005

Related U.S. Application Data

(60) Provisional application No. 60/565,713, filed on Apr. 26, 2004.

(51) Int. Cl.
*H01L 23/02* (2006.01)

(52) U.S. Cl. ...................... 174/539; 174/480; 361/695

(58) Field of Classification Search ............... 174/52.3, 174/48, 65 R, 53, 58; 361/695, 687; 220/3.3, 220/3.4, 3.5, 3.92, 3.94
See application file for complete search history.

(56) References Cited

U.S. PATENT DOCUMENTS

| | | | | |
|---|---|---|---|---|
| 6,040,526 | A * | 3/2000 | Olzak | 174/52.1 |
| 6,181,557 | B1 * | 1/2001 | Gatti | 361/695 |
| 6,453,378 | B1 * | 9/2002 | Olson et al. | 710/304 |
| 6,579,168 | B1 * | 6/2003 | Webster et al. | 454/184 |

\* cited by examiner

*Primary Examiner*—Dhiru R. Patel
(74) *Attorney, Agent, or Firm*—Bruce H. Johnsonbaugh

(57) ABSTRACT

A fire resistant, forced air cooled enclosure for one or more computer digital data storage devices is provided. An operable digital data storage device is mounted in a fire resistant enclosure. One or more openings are formed in the enclosure. A movable fire resistant hatch is positioned adjacent each of the openings and each hatch is movable between a closed position in which it closes the opening and an open position allowing ambient air to pass therethrough. A fan is positioned either inside or outside of the enclosure for actively driving ambient air through the opening to cool the data storage device. A hatch closure system is provided for closing each of said hatches automatically in the presence of a threshold temperature. The hatch closure system includes a temperature sensitive element which, when activated in the presence of the threshold temperature, causes the hatch to move to its closed position.

8 Claims, 17 Drawing Sheets

FIRE RESISTANT, FORCED AIR COOLED ENCLOSURE FOR COMPUTER DIGITAL DATA STORAGE DEVICE

CROSS REFERENCE TO RELATED APPLICATIONS

This application claims the benefit of and priority from U.S. provisional application Ser. No. 60/565,713 filed Apr. 26, 2004.

BACKGROUND AND BRIEF SUMMARY OF INVENTION

The present invention relates generally to apparatus for protecting an operable computer digital data storage device from damage and loss of data in a fire. More particularly, the present invention provides for the first time a compact, forced air cooled, fire resistant enclosure for an operable computer digital data storage device. Typical computer digital data storage devices include computer hard drives, optical disk drives, solid state memory devices, tape drives, computers, or any other device which can actively read and write digital data with the intent of storing and retrieving computerized digital data.

As digital data storage devices become able to store staggering amounts of data, the loss of a digital data storage device in a fire becomes more and more catastrophic. There is clearly a need to provide a compact, reliable fire resistant enclosure for operating digital data storage devices.

The prior art includes a relatively large enclosure for operable digital data storage devices, such as the Engler U.S. Pat. No. 6,158,833, which dissipates heat generated by the digital data storage device through the insulated walls of the container. The Engler design requires a relatively large enclosure since it does not provide any active or fan-driven cooling system. The present invention, in contrast, provides a compact enclosure a fraction of the size of the Engler enclosure. The compact size of the present invention is achieved primarily because of a forced-air cooling system not present in the Engler device.

The prior art includes other digital data storage device enclosures with "passive" cooling systems, such as Pihl et al U.S. Pat. No. 5,479,341 which cools by convection through a partially open vent door. This technique is "free convection" because no fan or other active device is used to cause the convection. The Kikinis U.S. Pat. No. 5,623,597 utilizes a rather complex, passive heat exchanger with a rather large heat sink structure. That design requires a cumbersome insulation injection mechanism to fill the heat sink space when a threshold temperature is sensed.

The prior art also includes the Kishon et al published U.S. application No. U.S. 2004/0064631 dated Apr. 1, 2004. The Kishon et al device utilizes passive conduction of heat generated by the data storage device through screws to the device cover (see paragraph [0021]). This technique is limited by the relatively low amount of heat transferable through the metal screws. The active, fan-driven cooling provided by the present invention achieves a much greater cooling capacity.

The prior art also includes forced air cooling systems for operational digital data storage drives, but not used together with a compact, fire resistant enclosure.

The present invention provides a compact fire resistant enclosure having one or more fire resistant movable hatches. In its open position, the movable hatch provides inlet and/or exhaust passage for ambient air. A fan driven cooling system (also referred to as "forced convection") actively cools the digital data storage device with ambient air. As used herein and in the claims, the word "fan" and the phrase "fan means" are used broadly to include bladed fans, squirrel cage fans, blowers, impellers and other active devices used to cause forced convection currents of air. When a predetermined temperature is sensed, the movable hatch or hatches automatically close. The mechanism for closing the hatch can be, without limitation, a temperature sensitive element such as an eutectic metal, plastic, rubber, chemical, liquid, solid or wax that melts or expands at a specific temperature and causes the hatch to close. The temperature sensitive element can be used together with actuation springs that expand or contract to close the hatch. The temperature sensitive element could also support the top of the enclosure and gravity close the hatch when the element melts. Alternately, the movable hatch or vent door may be electronically closed by a solenoid wherein the solenoid is actuated by a thermocouple or other element when a specific temperature is sensed. Other electronic actuation means or other passive methods (temperature sensitive elements) may also be utilized to automatically close the hatch or vent door. Furthermore, another embodiment is to provide air inlet and exhaust ports or passageways that are automatically closed, either actively (electronic actuation) or passively (temperature sensitive elements), when a specific temperature is sensed. Another variation is to cause the top (or upper wall) of the enclosure to open and close by either being hinged along one edge, for example, or by providing a moving portion of the top (or upper wall) of the enclosure. The "temperature sensitive element" is either an eutectic metal, wax, plastic, rubber, chemical, liquid, solid, electronic sensor or electronic actuator, for example. In addition, multiple data storage devices may be "rack mounted" in a single enclosure.

In each of the embodiments described herein, a temperature sensitive element is "activated" in the presence of a threshold temperature. For example, a meltable tab is activated by melting, a solenoid coupled to a temperature sensor is activated by either extending or retracting its arm in response to the temperature sensor, and an evaporative material is activated by expanding in the presence of the threshold temperature.

A primary object of the invention is to provide a fire resistant enclosure for an operable digital data storage device having a forced air cooling system capable of cooling large capacity data storage devices.

A further object of the invention is to provide a fire resistant enclosure for an operating digital data storage device having an extremely reliable sensing and actuation system with minimum moving parts.

A further object of the invention is to provide a fire resistant enclosure for an operable digital data storage device which substantially reduces or eliminates false alarms and the associated damage and mess created by prior art systems in the event of a false alarm.

Still another object of the invention is to provide a fire resistant enclosure for one or more operating computer digital data storage devices, which is relatively small in size while simultaneously having a large capacity for cooling the data storage device.

Other objects and advantages of the invention will become apparent from the following description and the drawings wherein:

BRIEF DESCRIPTION OF THE DRAWINGS

FIG. 7B illustrates the closed position after the meltable elements have melted;

FIG. 8B illustrates the closed position after the tabs have melted;

FIG. 9B illustrates are all hatches are closed after the meltable tabs have melted and the hatches are closed;

FIGS. 13A and 13B illustrate an embodiment utilizing two hatches actuated by two solenoids, wherein FIG. 13B illustrates the closed position after the solenoids are actuated;

DETAILED DESCRIPTION OF THE DRAWINGS

As used herein and in the claims, the phrase "fire resistant" refers to an enclosure capable of preventing loss of data from a digital data storage device within the enclosure when subjected to certain high temperature conditions for a specified period of time.

Figure 1:
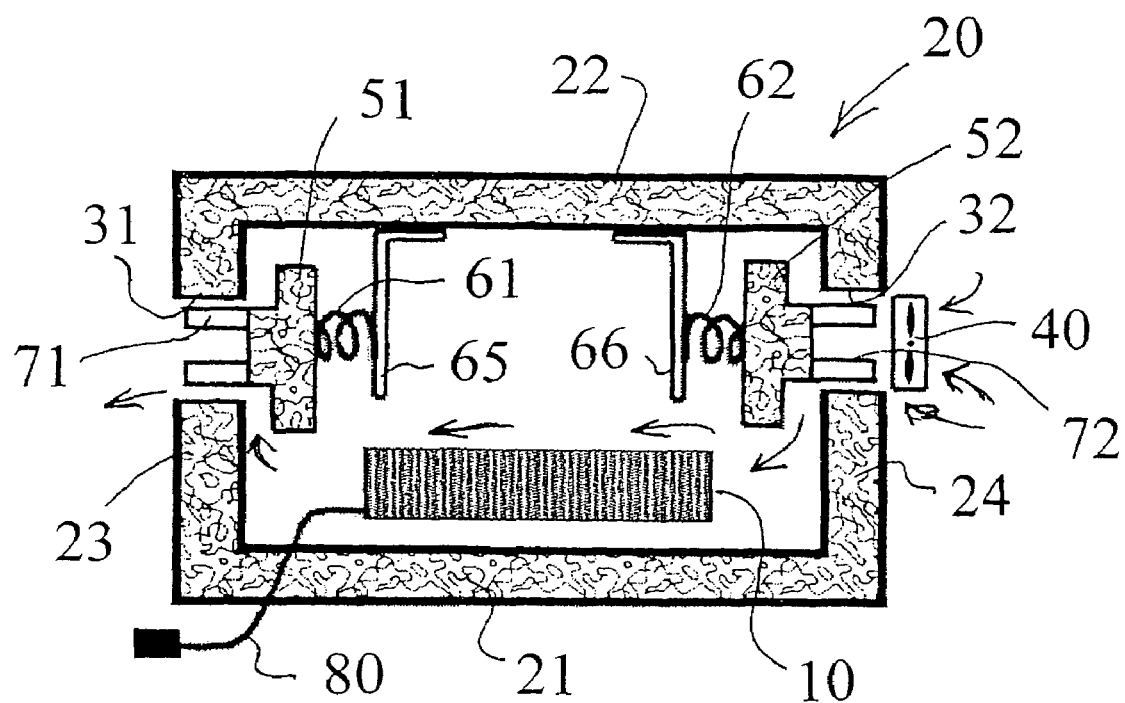
FIG. 1 is a schematic representation of one embodiment of the invention illustrating the device in use before a fire is sensed.

FIG. 1 is a schematic representation of one embodiment of the present invention wherein an operational computer digital data storage device 10 is carried inside a fire resistant enclosure shown generally as 20. The fire resistant enclosure 20 includes a lower or bottom wall 21, an upper wall 22, and side walls 23 and 24. The enclosure also includes solid end walls, not shown in FIG. 1. Side walls 23,24 each carry a movable hatch 51,52, respectively. The movable hatches 51,52 are positioned adjacent openings or passageways 31,32 formed in side walls 23,24, respectively. The movable hatches 51 and 52 are shown in their first or open position in FIG. 1 wherein ambient air may flow through openings or passageways 31 and 32. Incoming air flows through opening or passageway 32 and is driven by fan 40 as shown by the arrows across digital data storage device 10 and is exhausted as shown by the arrows through exhaust passageway 31.

In the open position illustrated in FIG. 1, temperature sensitive spacer elements 71,72 are carried by hatches 51,52, respectively. Spacers 71,72 are made from either an eutectic metal or wax which is designed to melt at a predetermined temperature such as 300° F.

Movable hatches 51 and 52 are held in their open position by springs 61 and 62 which are in turn anchored to upper wall 22 by brackets 65 and 66.

Power for digital data storage device 10 as well as fan 40 enters the enclosure through bottom 21 through a cable 80. An optional temperature sensitive fuse (not shown) may be utilized to shut off power to digital data storage device 10 and fan 40 when a predetermined temperature, such as 300° F., is sensed.

The enclosure 20 also includes a removable segment (not shown in FIG. 1) to allow installation and removal of the data storage device 10. The preferred removable segment is a removable lid, described below.

Figure 2:
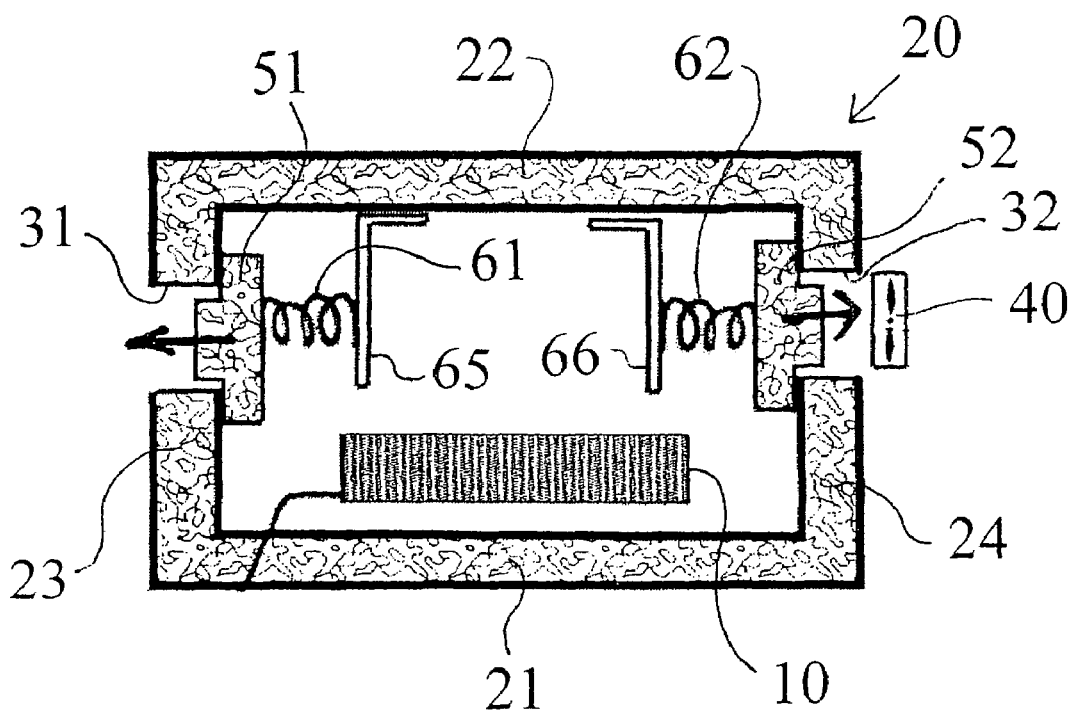
FIG. 2 is a schematic representation of the device shown in FIG. 1 illustrating the device after fire has been sensed.

FIG. 2 illustrates the embodiment of FIG. 1 when the predetermined temperature has been achieved. The spacers 71 and 72 have melted, and movable hatches 51 and 52 have moved to their closed position by the expansion of springs 61 and 62. Electrical power to digital data storage device 10 and fan 40 has been interrupted, either by a temperature sensitive fuse blowing or power or data line 80 becoming destroyed by fire. Alternatively, the power or data lines could be made of a small enough gauge as to not create an adequate thermal path for the extreme outside air temperature to damage the internal digital data storage device. In the embodiment shown in FIGS. 1 and 2, springs 61,62 together with temperature sensitive elements 71,72 comprise hatch closure means for closing hatches 51,52 automatically when a threshold temperature is reached, signifying the presence of fire.

It is significant to note that temperature sensitive spacers 71 and 72 will only become activated and melt when the threshold temperature has been sensed and sustained long enough for spacers 71 and 72 to melt. This feature essentially eliminates false alarms, which are an inherent weakness of some prior art devices. Furthermore, some prior art devices cause the flow of insulation or other material in the event of a false alarm, resulting in a mess to be cleaned up, and related down time.

Figure 3A:
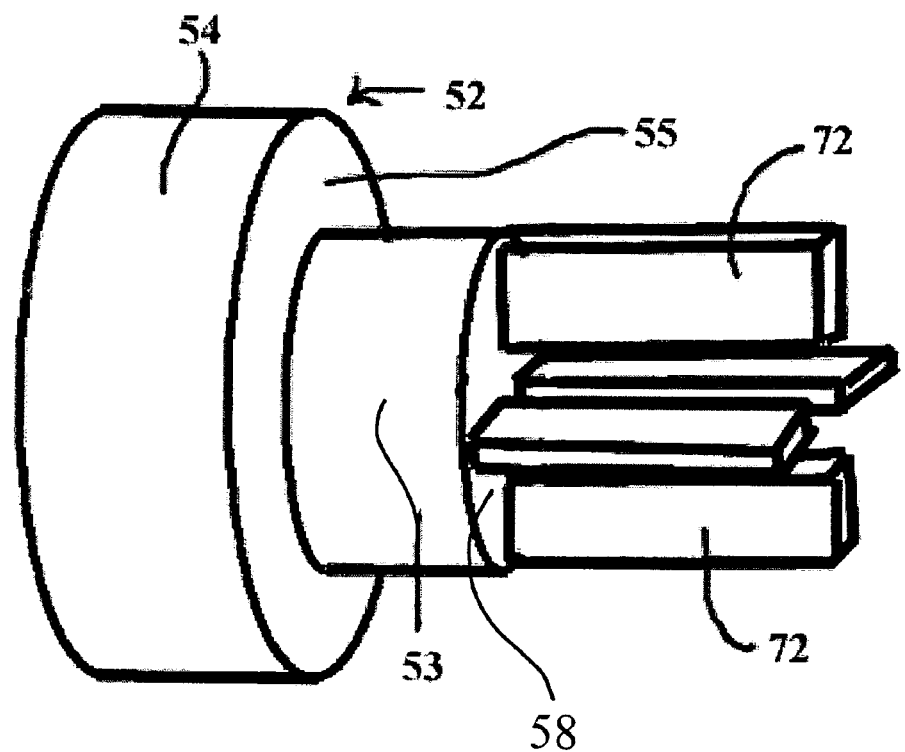
FIG. 3A is a schematic representation of the movable hatch and temperature sensitive spacers used in the embodiment shown in FIGS. 1 and 2.

FIG. 3A illustrates movable hatch 52 and temperature sensitive spacer 72 shown in FIGS. 1 and 2. The movable hatch 52 includes a cylindrical body portion 53 which slidably engages opening 32 in side wall 24, as shown in FIGS. 1 and 2. A cap portion 54 is formed as a unitary structure with body 53. Cap 54 is a circular shaped disc having a flat front face 55 which engages the inner surface of wall 24 when hatch 52 moves to its closed position as shown in FIG. 2. The cap is of larger diameter than the body portion 53. The temperature sensitive element includes tabs 72 which are planar tabs connected to the end 58 of body portion 53 and which extend radially outwardly. This configuration allows cooling air to pass between the temperature sensitive elements 72 and continually cool the data storage device 10. The body portion 53 and the cap portion 54 are preferably injection molded and filled with fire resistant insulation. The planar tabs 72 hold the hatch in its open position.

Figure 3B:
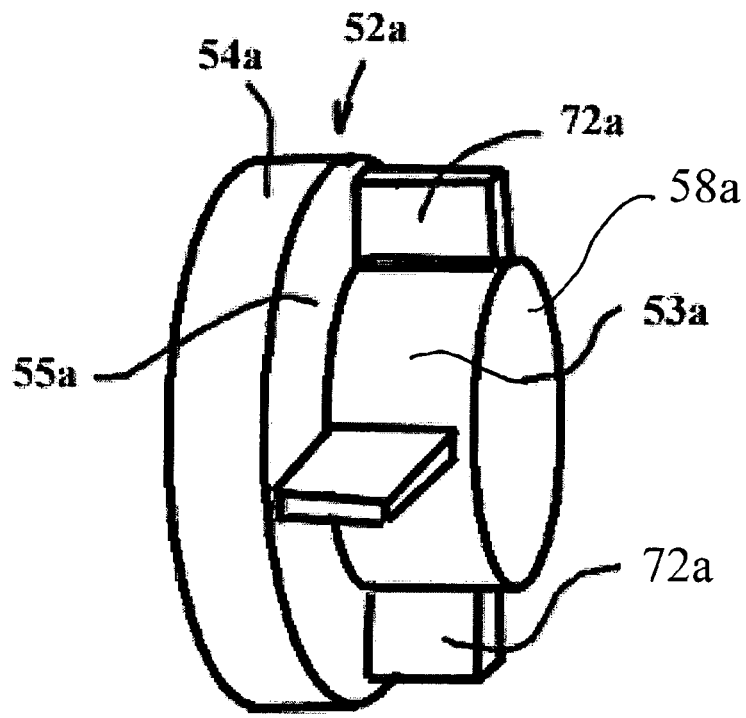
FIG. 3B is a schematic representation of an alternate movable hatch.

FIG. 3B illustrates an alternate hatch design 52*a* which is similar to the hatch design 52 shown in FIG. 3A, except that planar tabs 72*a* are carried on the cylindrical surface of body 53*a* and extend radially outwardly.

Figure 4:
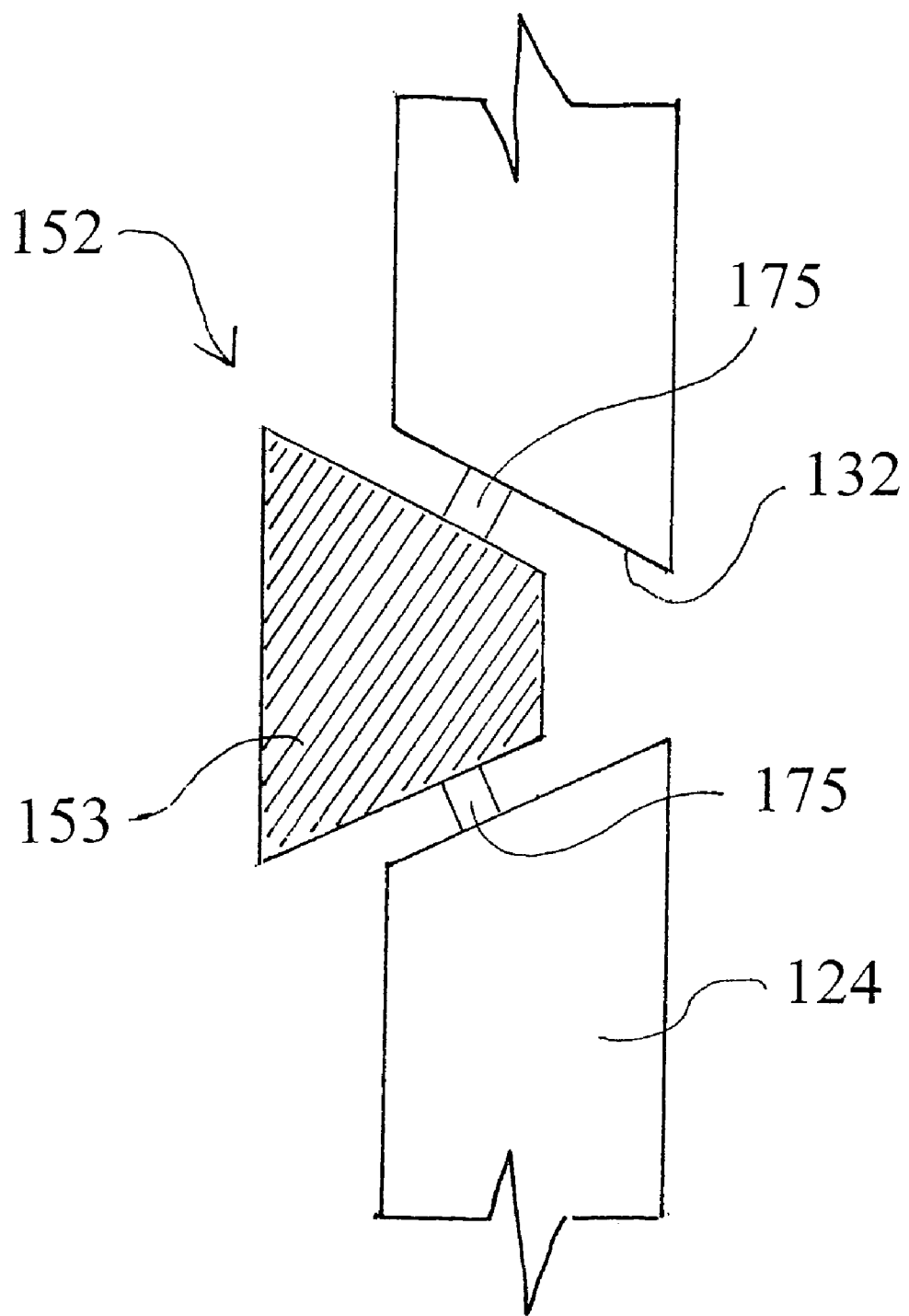
FIG. 4 is a schematic representation of an alternate movable hatch.

FIG. 4 illustrates an alternate configuration of movable hatch 152 and an alternate configuration of opening 132 in side wall 124. Opening 132 has a frusto-conical shape. Hatch 152 has a body portion 153 of frusto-conical shape which is identical to the shape of opening 132 in side wall 124. Planar tabs 175 are temperature sensitive. Movable hatch 152 is driven by a spring mounted to a bracket as is shown in FIG. 1. The spring and bracket are omitted from FIG. 4 in the interest of brevity. Alternate shapes and configurations may be utilized for the openings in the side wall and for the movable hatch. For example, the hatch can be positioned in the bottom wall of the enclosure or the top wall. The preferred embodiment utilizes two movable hatches mounted in opposite side walls.

Figure 5:
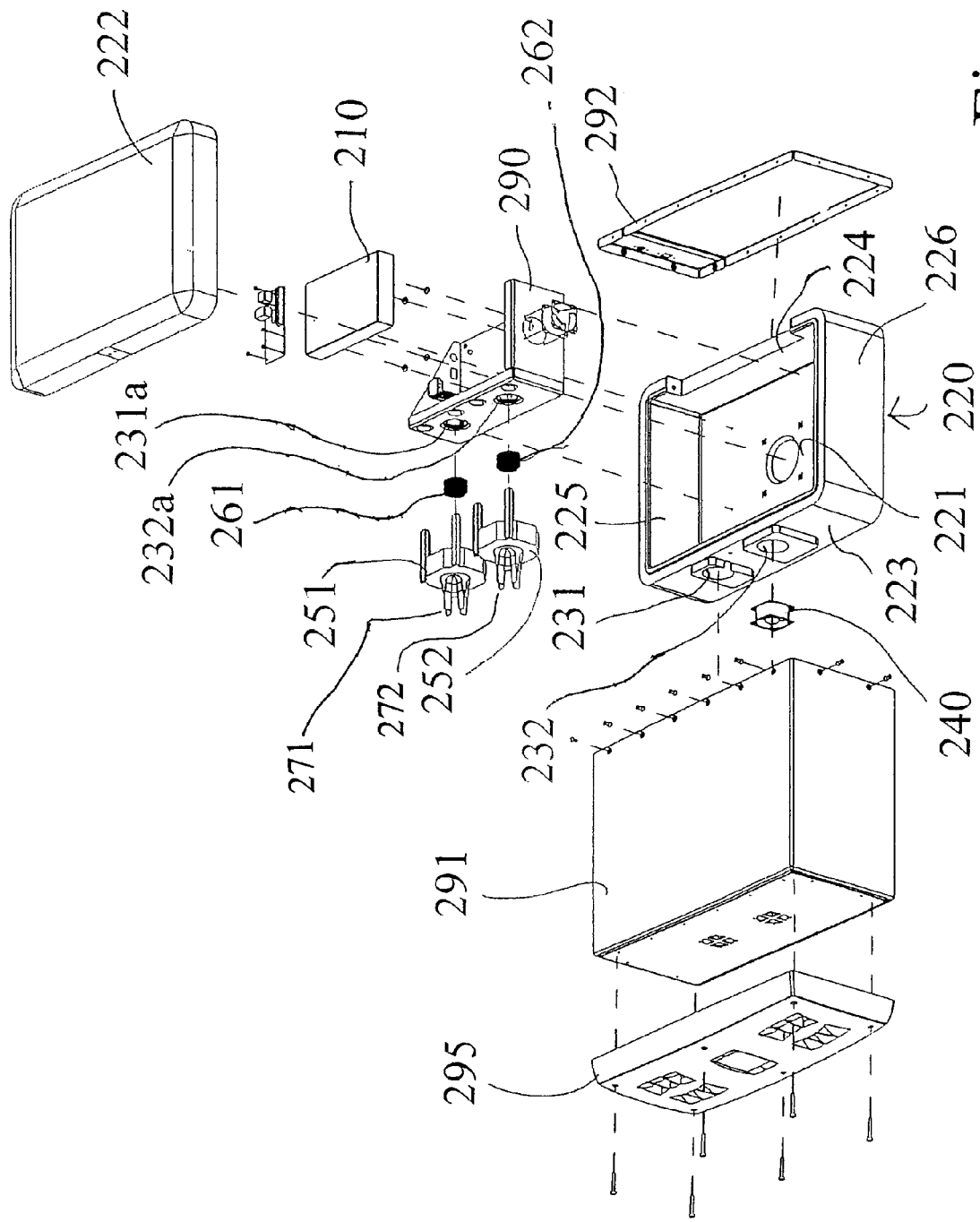
FIG. 5 is a perspective, and exploded view, of the components of an alternate embodiment of the invention.

FIG. 5 is a perspective and exploded assembly drawing of an alternate embodiment of the invention. A digital storage device 210 is mounted to an internal mounting plate 290. A fire resistant enclosure base 220 includes bottom wall 221, side wall 223, side wall 224 and end walls 225 and 226. A removable lid 222 is of fire resistant material and is completely removable from the enclosure base 220 to allow insertion and removal of the data storage device 210. In the embodiment shown in FIG. 5, the movable hatches 251 and 252 carrying meltable spacers 271,272 are both positioned adjacent openings 231 and 232 in a side wall 223 of the fire resistant enclosure base 220. Openings 231*a* and 232*a* are formed in internal mounting plate 290 to facilitate mounting of the movable hatches 251 and 252. Fan 240 is positioned adjacent the inlet opening 232 and drives air into the enclosure and outwardly through exhaust opening 231. An optional sheet metal outer enclosure 291 is provided to protect fire resistant enclosure base 220 and fire resistant lid 222. A metallic rear cover 292 is also provided to protect the rear wall 224 of fire resistant enclosure base 220. An optional plastic bezel 295 is also provided. Springs 261 and 262 urge the movable hatches 251 and 252 against side wall 223.

FIGS. 6A–9B illustrate alternate embodiments of the invention utilizing a temperature sensitive element which melts at a threshold temperature being used in conjunction with one or more movable hatches.

Figure 6A:
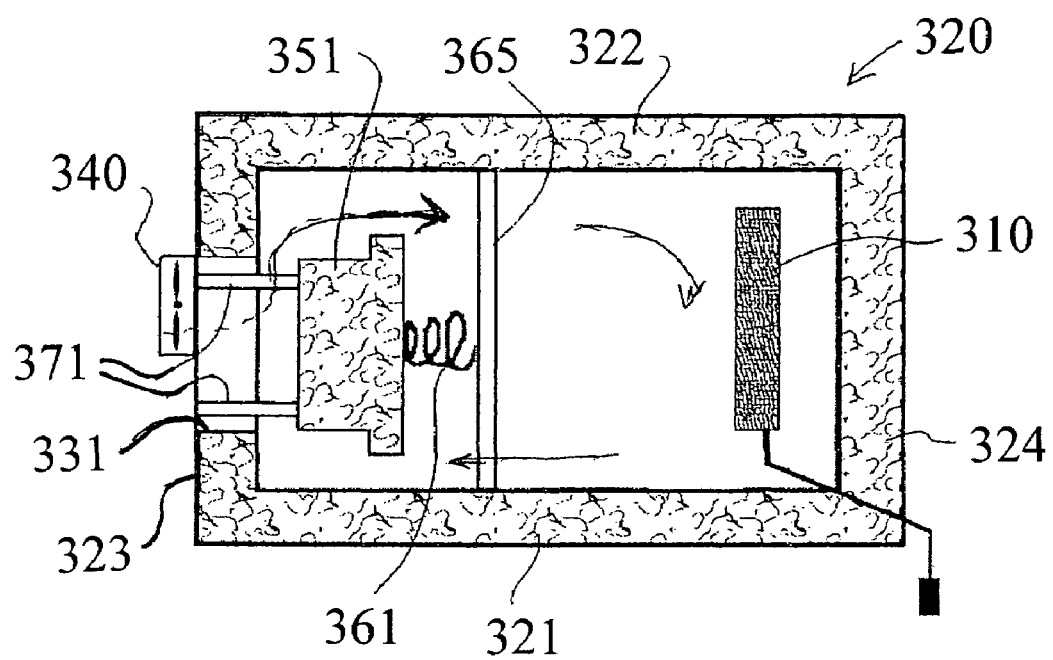
FIGS. 6A and 6B are schematic representations of one embodiment wherein a single, movable hatch is shown held open by meltable tabs in FIG. 6A and is shown in its closed position in FIG. 6B.

FIG. 6A illustrates an embodiment including enclosure 320 and a single data storage device 310. This embodiment utilizes a single movable hatch 351 which is positioned adjacent opening 331 formed in side wall 323 of enclosure 320. Fan 340 circulates ambient air in the direction shown by the arrows, whereby air flows inwardly above hatch 351, flows across data storage device 310 and then exhausts around the opposite side of hatch 351. Alternately, fan 340 could be positioned adjacent the lower edge of opening 331 and blow air inwardly beneath hatch 351 and circulate the air upwardly across data storage device 310 and then outwardly above hatch 351.

Figure 6B:
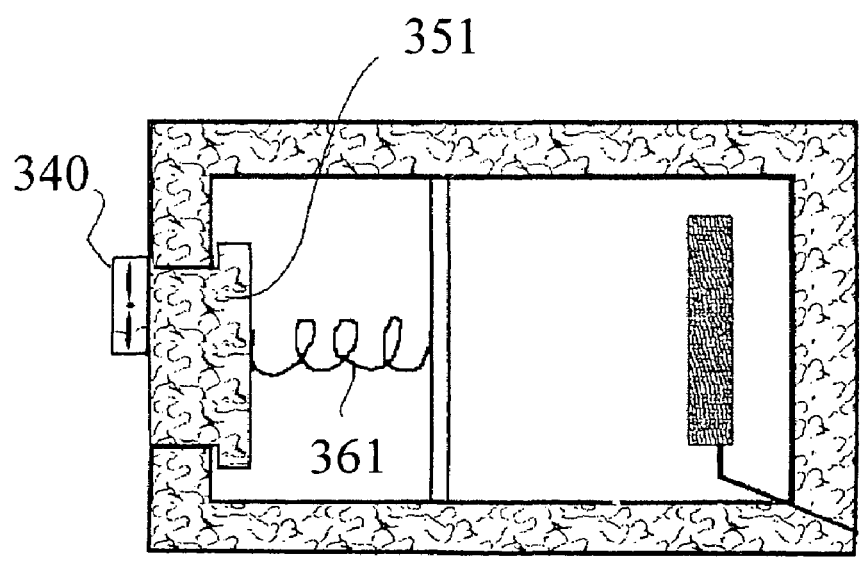

FIG. 6B illustrates the closed position of hatch 351 of FIG. 6A. Meltable tabs 371 have melted, allowing spring 361 to close hatch 351.

Figure 7A:
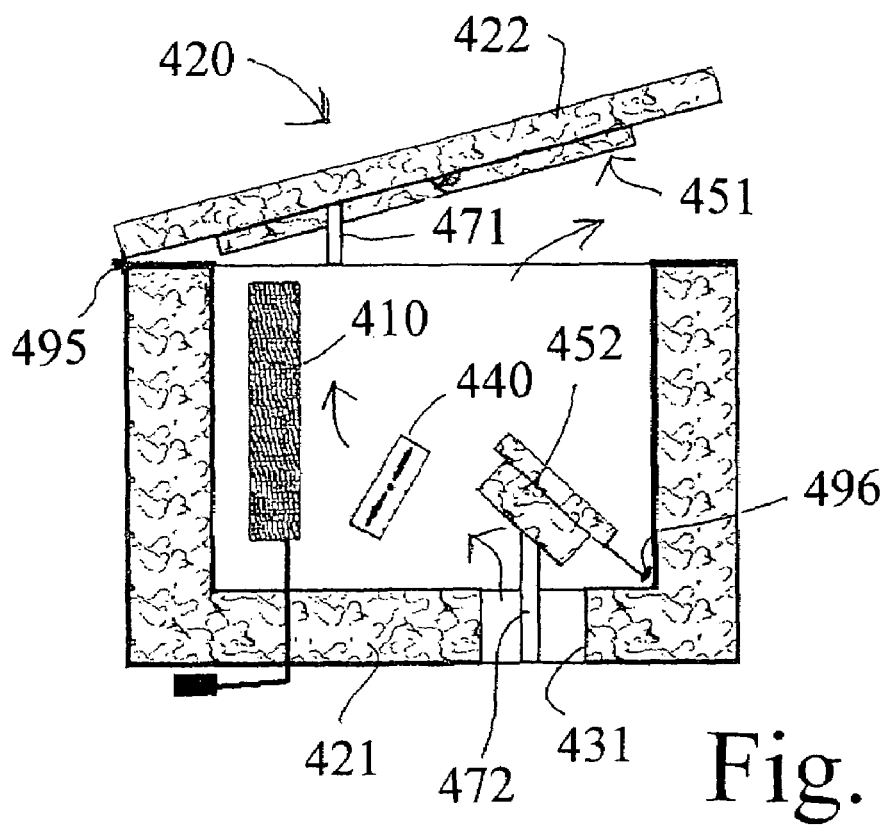
FIGS. 7A and 7B illustrate an embodiment wherein the lid of the enclosure forms a first hatch and a second hatch is formed in the bottom wall, wherein both hatches are held open by meltable spacers as shown in FIG. 7A.
Figure 7B:
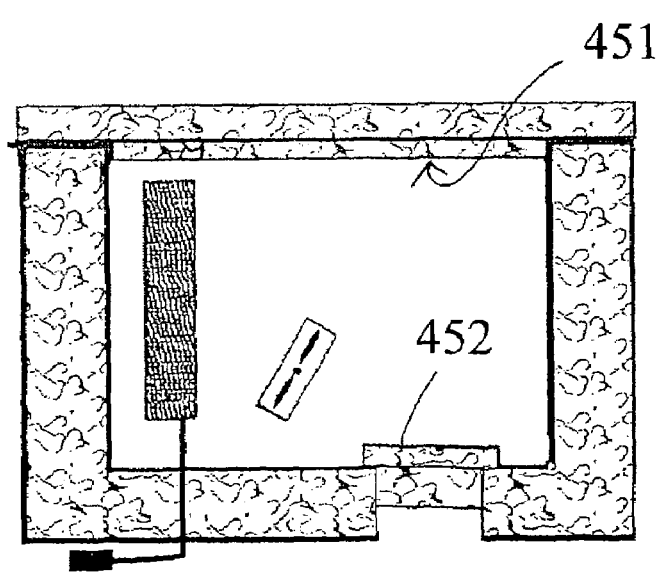

FIGS. 7A and 7B illustrate an embodiment utilizing enclosure 420 and a single data storage device 410. In this embodiment, the upper wall or lid 422 of enclosure 420 forms a first hatch which is hinged at pivot point 495 and is held in its open position shown in FIG. 7A by a meltable spacer 471. A second hatch 452 is positioned adjacent opening 431 formed in the bottom wall 421 of enclosure 420. Hatch 452 is pivoted at pivot point 496 and is held in its open position shown in FIG. 7A by meltable spacer 472. Fan 440 draws air inwardly through opening 431 upwardly across data storage device 410 and upwardly and outwardly beneath raised hatch 451.

FIG. 7B illustrates how hatch 451 and hatch 452 have closed by gravity when a threshold temperature has been sensed and meltable elements 471 and 472 have melted.

Figure 8A:
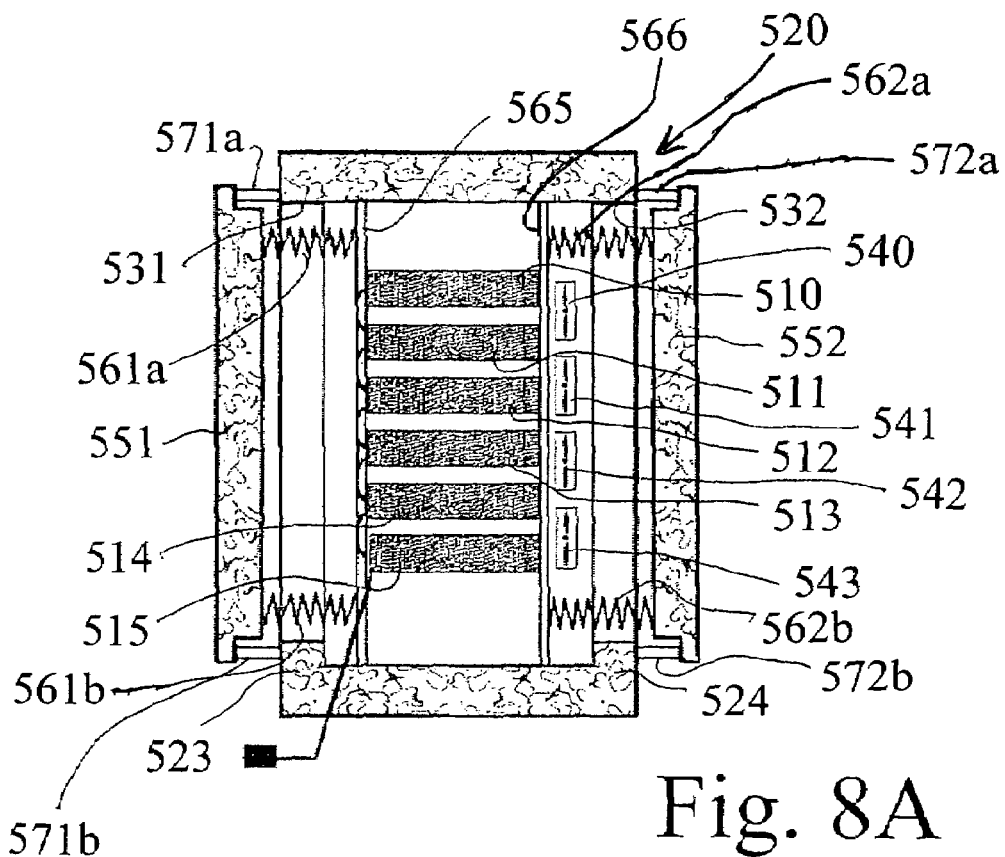
FIGS. 8A and 8B illustrate a further embodiment wherein six separate data storage devices are mounted within the enclosure, meltable tabs hold the hatches in their open position shown in FIG. 8A.
Figure 8B:
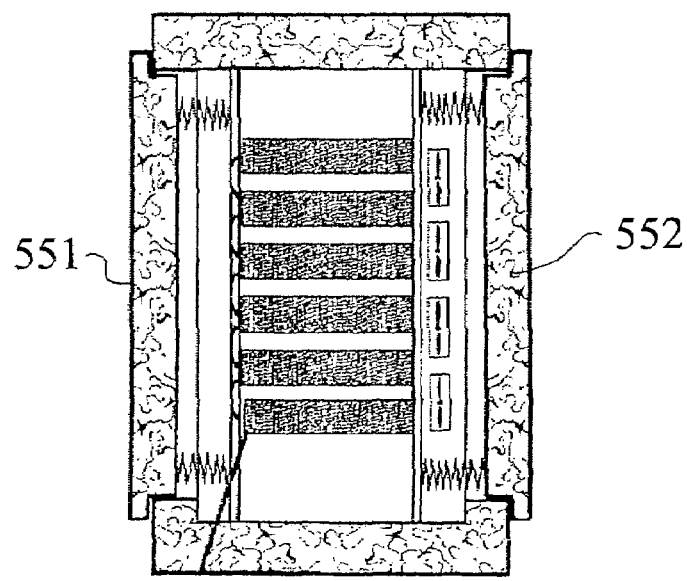

FIGS. 8A and 8B illustrate an embodiment including enclosure 520 wherein six different "rack mounted" data storage devices 510–515 are mounted. Enclosure 520 includes side walls 523 and 524 having large passageways 531 and 532 formed therein. Hatches 551 and 552 are mounted adjacent passageways 531 and 532. Hatches 551 and 552 may be rectangular or arcuate in shape. Hatches 551 and 552 are sufficiently large to allow adequate airflow to cool all six data storage devices 510–515. Four fans 540–543 are provided to provide sufficient cooling for the six data storage devices. Because of the relative large size of hatches 551 and 552, multiple springs are utilized. Hatch 551 is connected by two springs 561*a* and 561*b* to bracket 565. Similarly springs 562*a* and 562*b* connect hatch 552 to bracket 566. Two meltable tabs 571*a* and 571*b* hold hatch 551 in its open position. Similarly, meltable tabs 572*a* and 572*b* hold hatch 552 in its open position shown in FIG. 8A.

FIG. 8B illustrates how hatches 551 and 552 have moved to their closed positions upon the melting of tabs 571*a*, 571*b*, 572*a* and 572*b*.

Figure 9A:
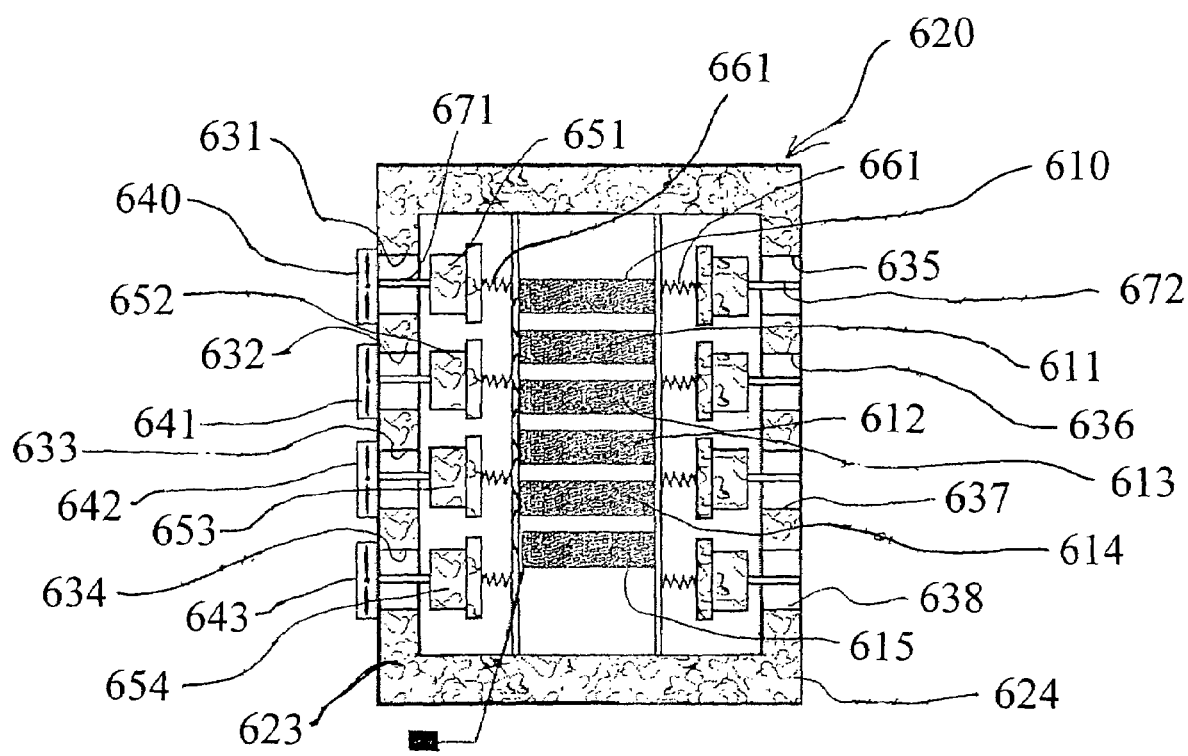
FIGS. 9A and 9B illustrate a further embodiment wherein six rack mounted data storage devices are mounted within the enclosure and separate inlet and outlet passageways are provided.
Figure 9B:
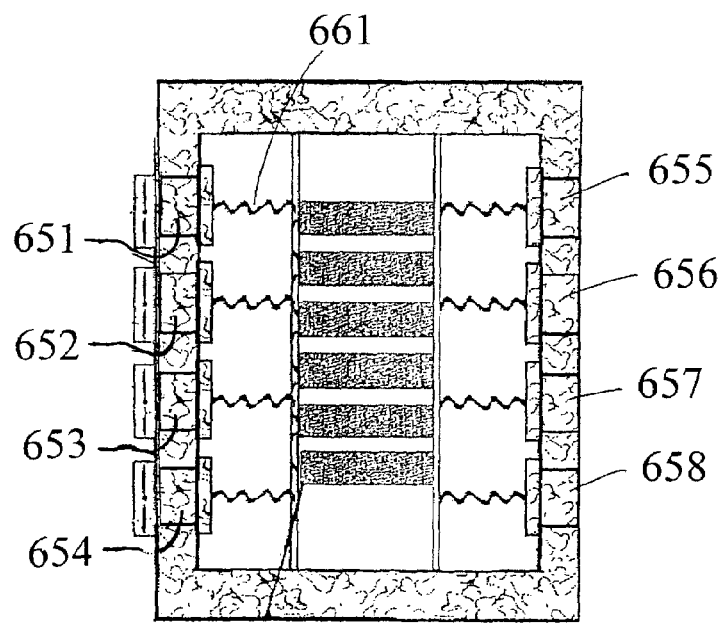

FIGS. 9A and 9B illustrate an embodiment including enclosure 620 and six "rack mounted" data storage devices 610–615. Side wall 623 includes four passageways 631–634. Hatches 651–654 are mounted adjacent openings 631–634. Individual fans 640–643 are mounted adjacent openings 631–634 and by "forced convection" cause ambient air to move across data storage devices 610–615. Side wall 624 has four outlet passageways 635–638 through which the cooling air is exhausted as shown by the arrows. Meltable tabs 671 and 672 hold each of the eight hatches shown in FIG. 9A in their open position illustrated. Springs 661 hold all eight hatches open.

FIG. 9B illustrates how all eight hatches have closed when the threshold temperature is sensed and the meltable tabs have melted and allowed springs 661 to close all eight hatches 651–658.

Figure 10A:
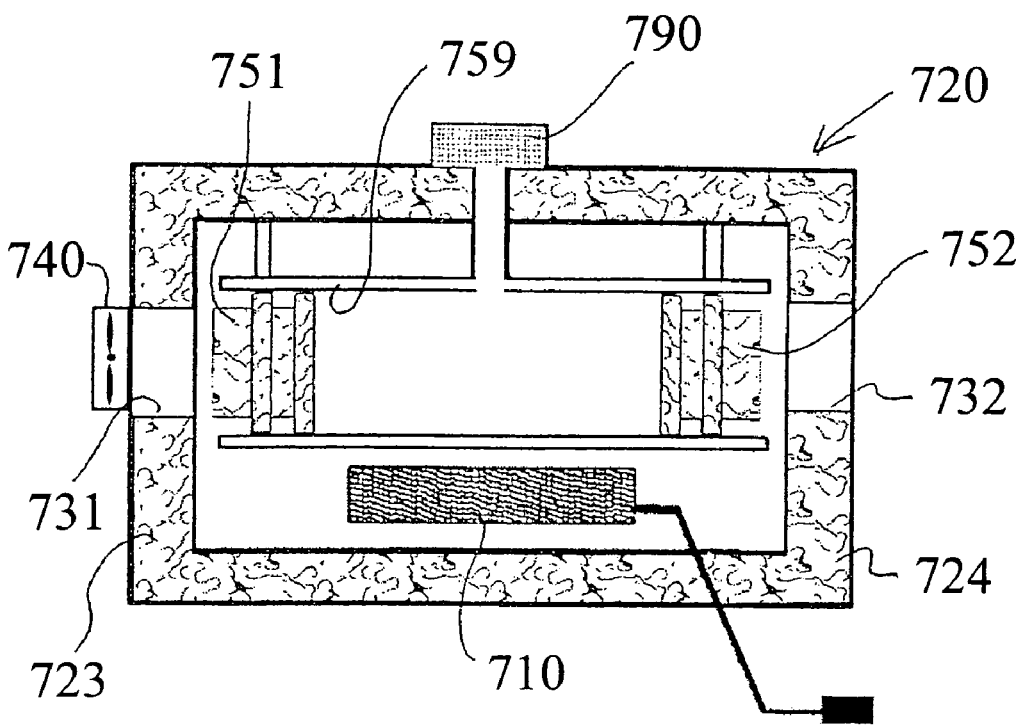
FIGS. 10A and 10B show an alternate embodiment wherein a contained evaporative substance causes two hatches to close by the expansion of the evaporative substance as shown in FIG. 10B.

FIGS. 10A, 10B and 11A, 11B show alternate embodiments wherein a contained, evaporative substance is utilized to cause the movable hatch or hatches to close upon the sensing of a threshold temperature. FIG. 10A illustrates enclosure 720 housing a single data storage device 710. Side wall 723 and side wall 724 each have a passageway 731 and 732 formed therein. Fan 740 causes air to flow inwardly as shown by the arrows across data storage device 710 and outwardly through passageway 732. Hatches 751 and 752 are slidably mounted within piston tube 759 which extends generally from a position near inlet passageway 731 to a position near outlet passageway 732. A housing 790 contains an evaporative substance which expands upon being exposed to a given temperature such as 300° F.

Figure 10B:
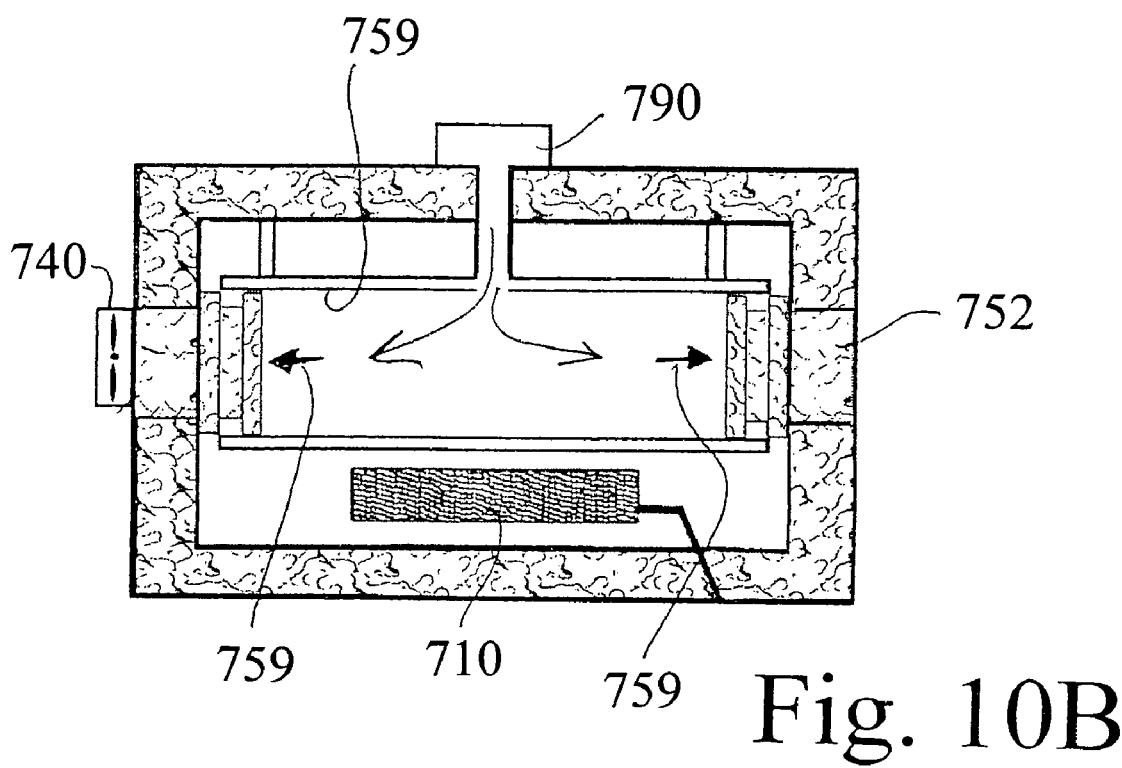

FIG. 10B illustrates that when the threshold temperature is sensed, the evaporative substance in housing 790 is activated and expands into transversely mounted piston 759, causing hatches 751 and 752 to move outwardly as shown by arrows 759 to seal passageways 731 and 732.

Figure 11A:
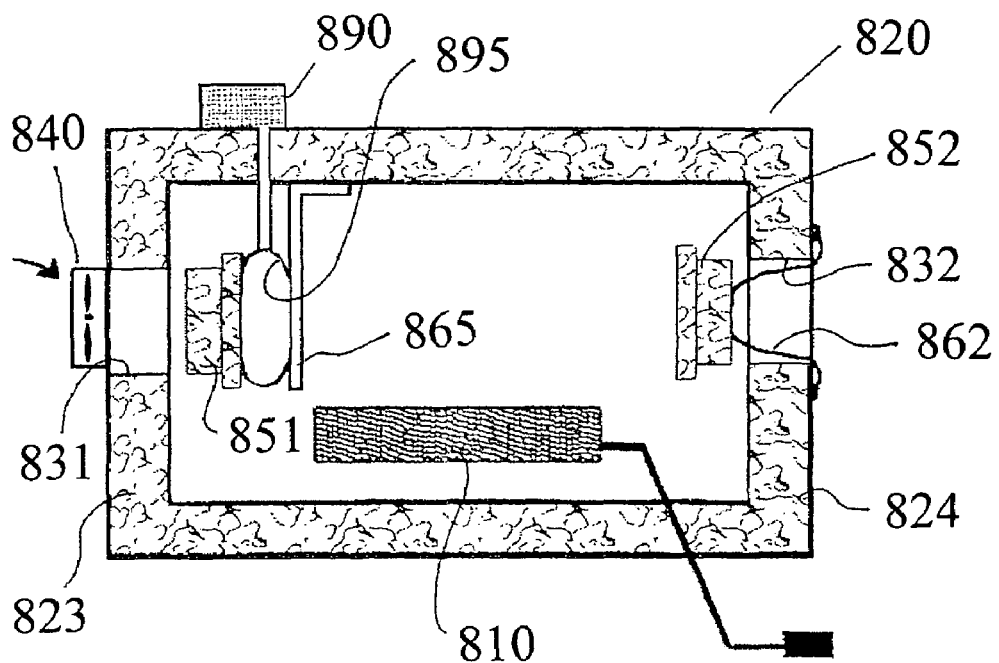
FIGS. 11A and 11B illustrate a second embodiment utilizing an evaporative substance to actuate one hatch and utilizing a shape memory material to activate a second hatch, FIG. 11B showing the closed position of both hatches.
Figure 11B:
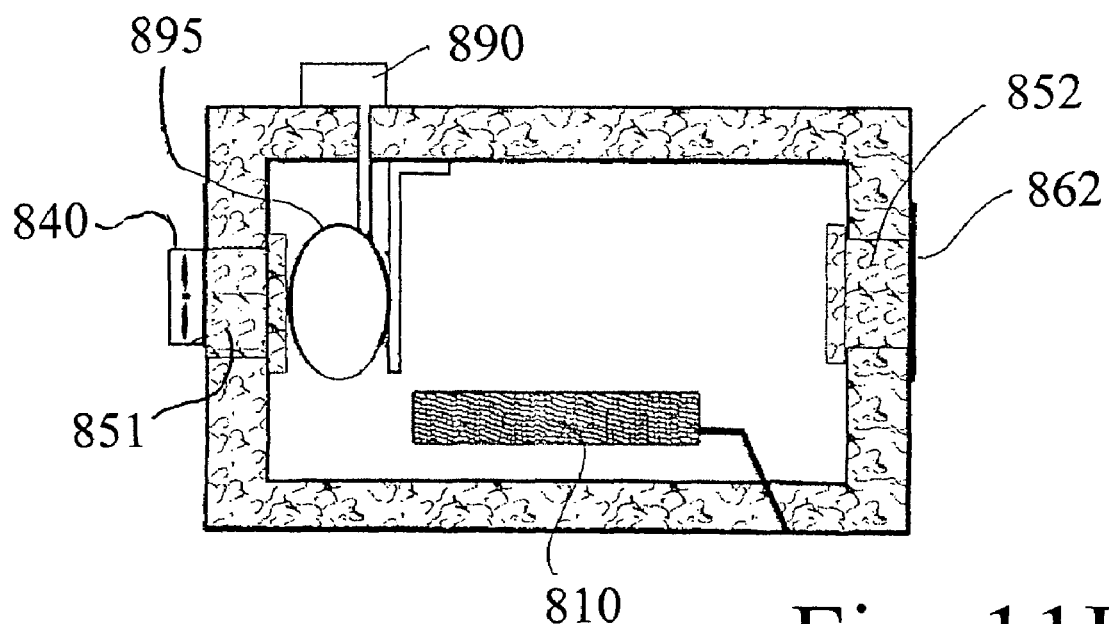

FIGS. 11A and 11B illustrate a second embodiment wherein an evaporative substance is utilized together with a "shape memory" material to close dual hatches. FIG. 11A illustrates enclosure 820 housing a single data storage device 810. Side walls 823 and 824 have passageways 831,832 formed therein, respectively. Fan 840 blows air through inlet passageway 831 across data storage device 810 and outwardly through exit passageway 832. A first movable hatch 851 is positioned adjacent passageway 831 and is held in place by an expandable bladder 895. Bladder 895 is connected to bracket 865. Evaporative substance is contained in housing 890 which is in fluid communication with bladder 895. When a threshold temperature is sensed, the evaporative fluid from container 890 is activated and expands bladder 895, closing hatch 851, as shown in FIG. 11B. The second hatch 852 is held in position by a "shape memory" spring 862. Spring 862 holds hatch 852 in its open position shown in FIG. 11A. Spring 862 reacts to a given threshold temperature, such as 300° F. by moving to its flat position shown in FIG. 11B wherein hatch 852 is moved to its closed position in which it forms a seal with passageway 832.

Figure 12A:
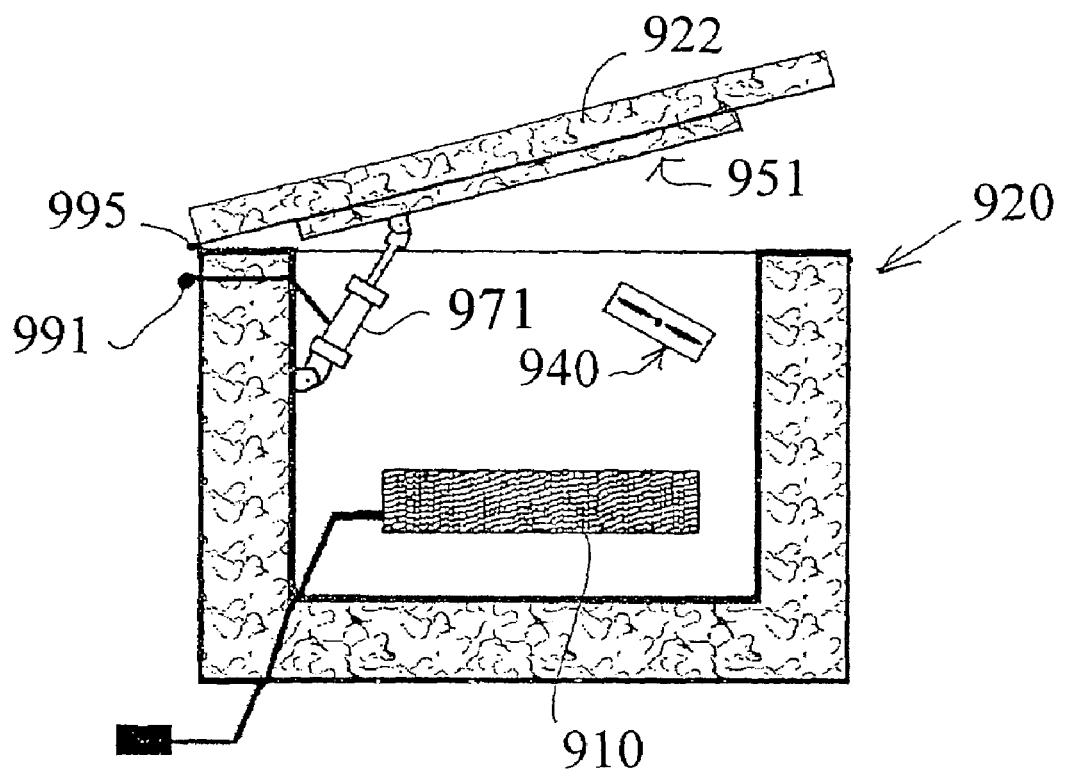
FIGS. 12A and 12B illustrate an embodiment wherein the lid of the enclosure forms a single, movable hatch which is actuated by a solenoid, FIG. 12B showing the closed position after the solenoid has been activated.
Figure 12B:
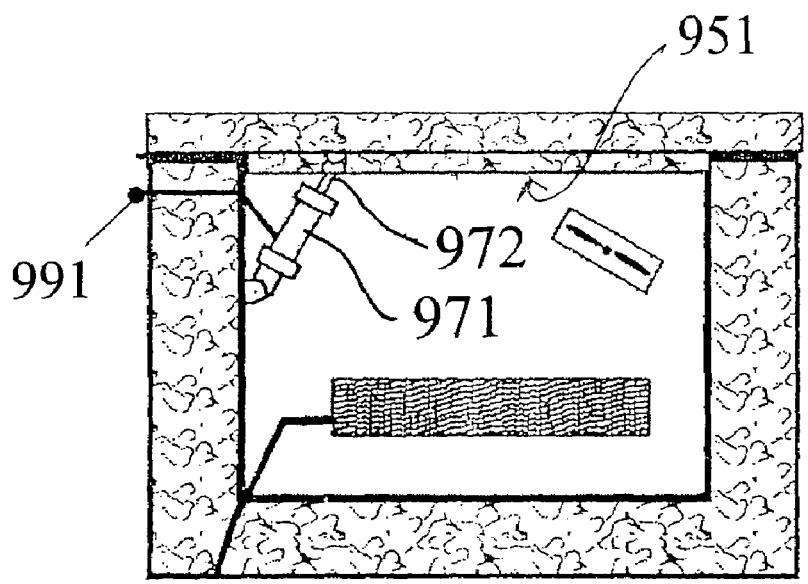

FIGS. 12A through 18B illustrate alternate embodiments utilizing one or more solenoids as part of the actuation mechanism for one or more hatches. Each solenoid is electrically connected to a temperature sensor and is activated when the threshold temperature is sensed. FIG. 12A includes an enclosure 920 housing a single data storage device 910. The lid 922 of enclosure 920 forms a single movable hatch 951 which is hinged at point 995. Hatch 951 is held in its open position illustrated in FIG. 12A by solenoid 971. Solenoid 971 is connected to temperature sensor 991. Fan 940 cools the data storage device 910 as described above. When a threshold temperature is sensed by sensor 991, solenoid 971 is activated and caused to retract its arm 972, thereby closing hatch 951.

Figure 13A:
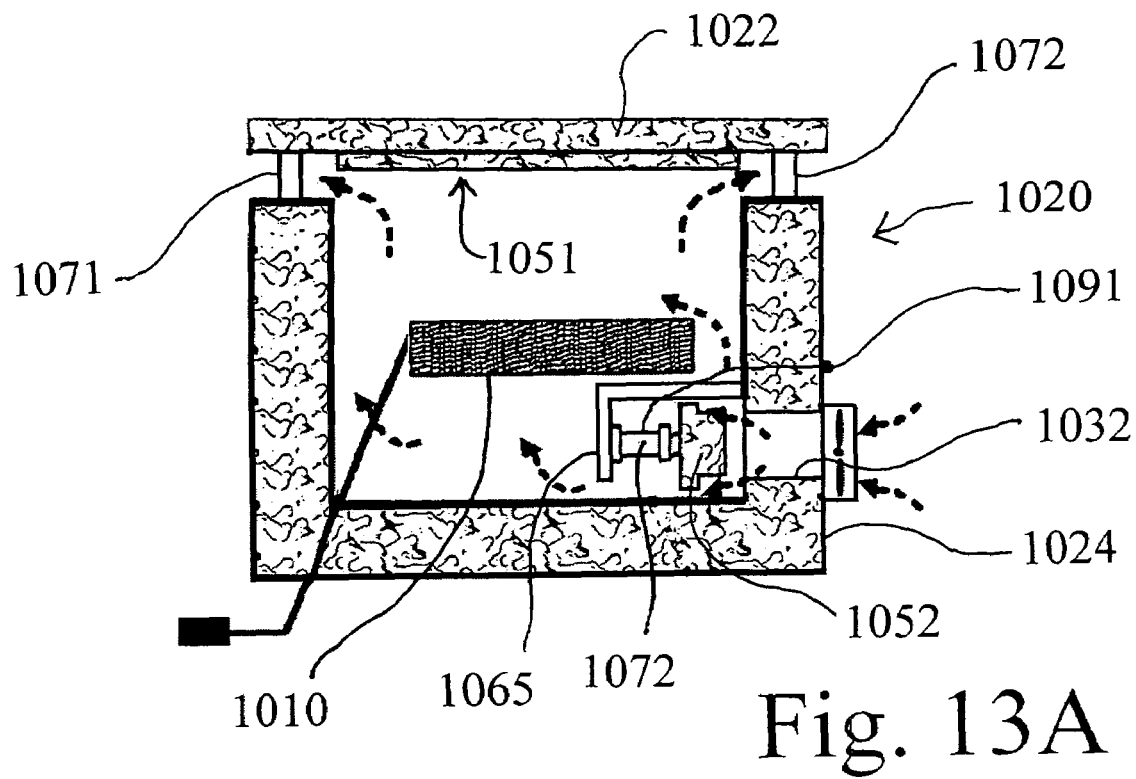

FIG. 13A illustrates enclosure 1020 housing a single data storage device 1010. The lid 1022 of enclosure 1020 forms hatch 1051 and is held in its open position shown in FIG. 13A by multiple tabs 1071 and 1072. A second hatch 1052 is positioned near passageway 1032 formed in side wall 1024. Solenoid 1072 is mounted to bracket 1065 and holds hatch 1052 in its open position shown in FIG. 13A. Solenoid 1072 is connected to temperature sensor 1091. In the open position of hatch 1052, as shown in FIG. 13A, solenoid 1072 has its arm in the retracted position.

Figure 13B:
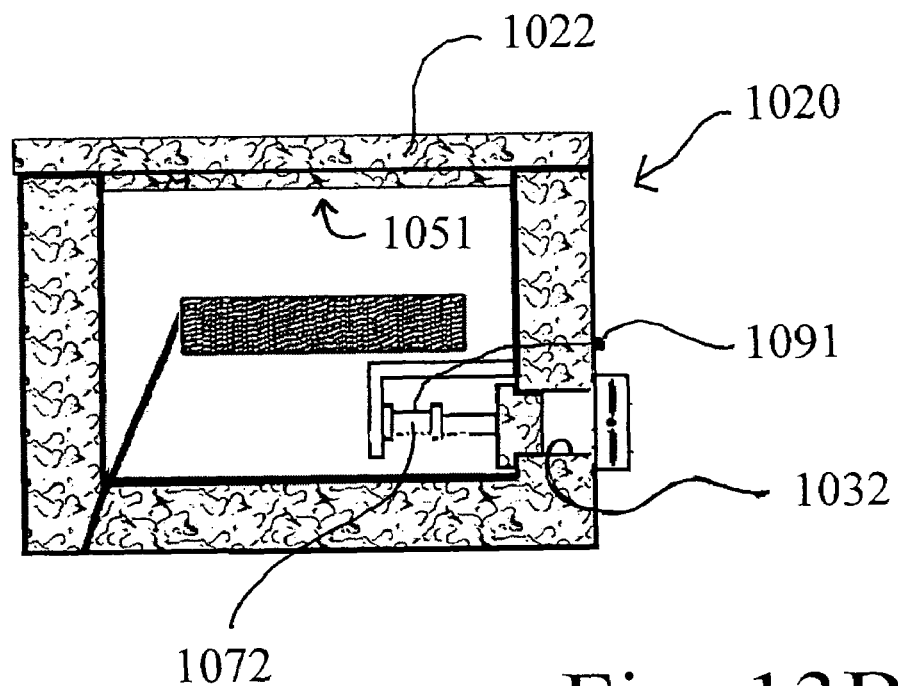

FIG. 13B illustrates the closed position of enclosure 1020. After a threshold temperature has been sensed, multiple tabs 1071 and 1072 are "activated" in the sense they have melted and allowed hatch 1051 to close by gravity. Temperature sensor 1091 has caused solenoid 1072 to become activated or energized and move its arm to its extended position wherein hatch 1052 is sealed against opening 1032.

Figure 14A:
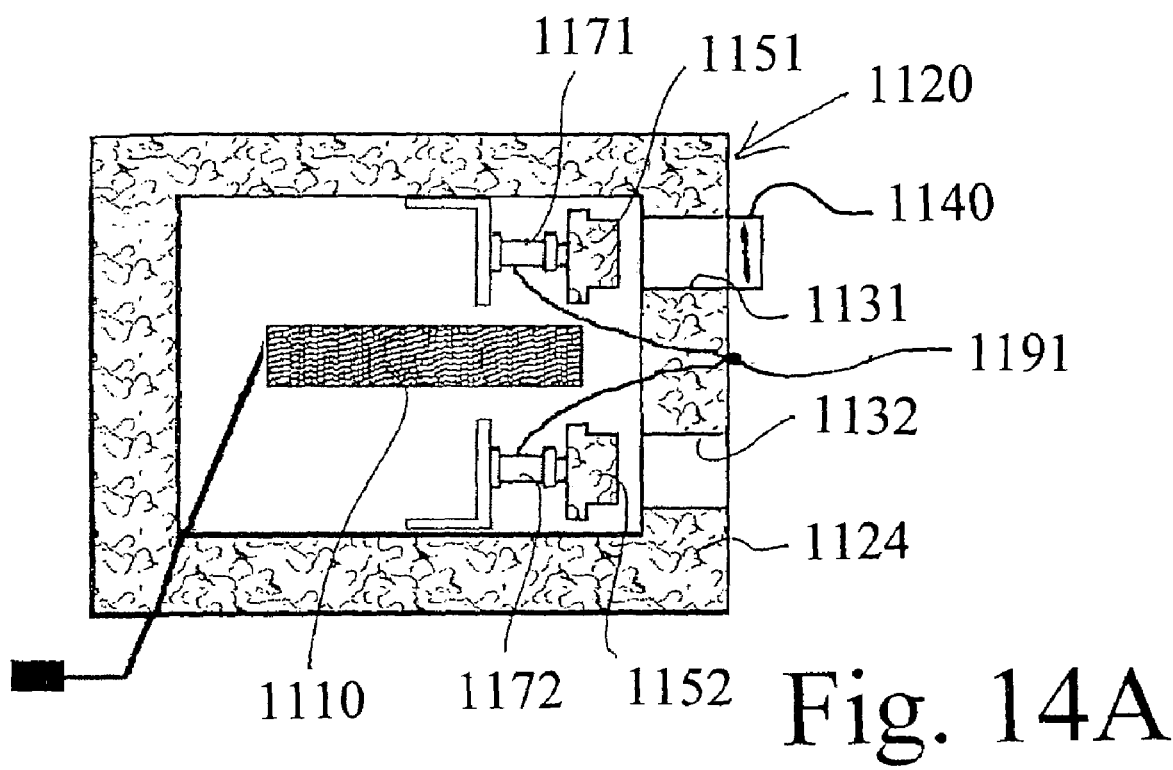
FIGS. 14A and 14B illustrate an embodiment wherein two hatches having separate solenoids are connected to a single temperature sensor.
Figure 14B:
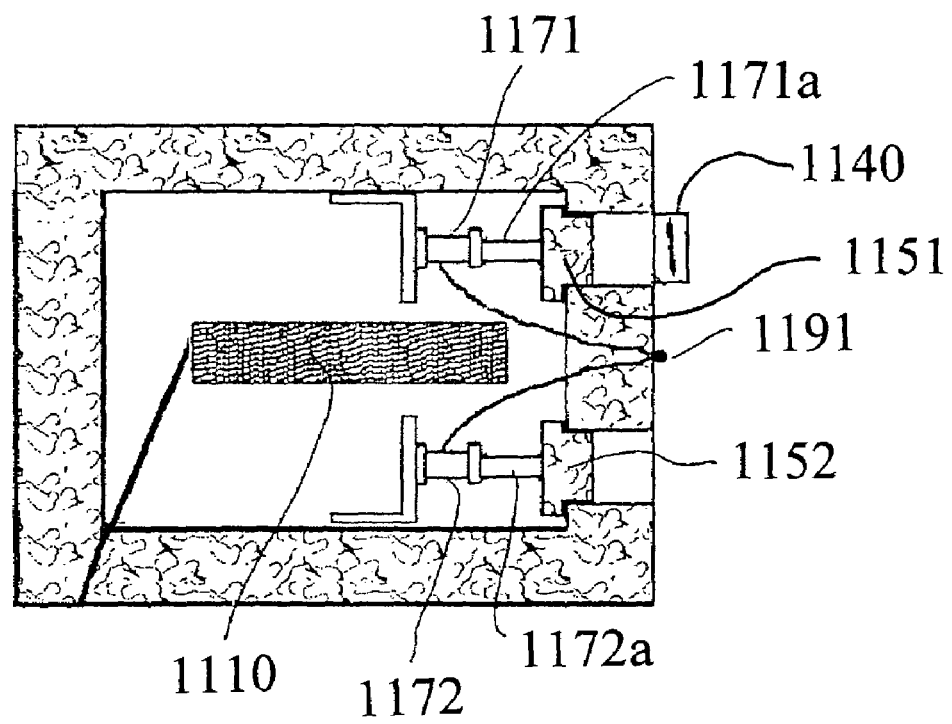

FIGS. 14A and 14B show an alternate embodiment wherein enclosure 1120 houses a single data storage device 1110. Side wall 1124 has an inlet passageway 1131 and an outlet passageway 1132 formed therein. First and second hatches 1151 and 1152 are positioned adjacent openings 1131 and 1132. Solenoids 1171 and 1172 hold hatches 1151 and 1152 in their open position shown in FIG. 14A. Temperature sensor 1191 is connected to both solenoids 1171 and 1172. FIG. 14B illustrates the closed position wherein sensing element 1191 has sensed the threshold temperature and has energized solenoids 1171 and 1172, causing them to move their arms 1171a and 1172a to their extended position wherein hatches 1151 and 1152 are closed.

Figure 15A:
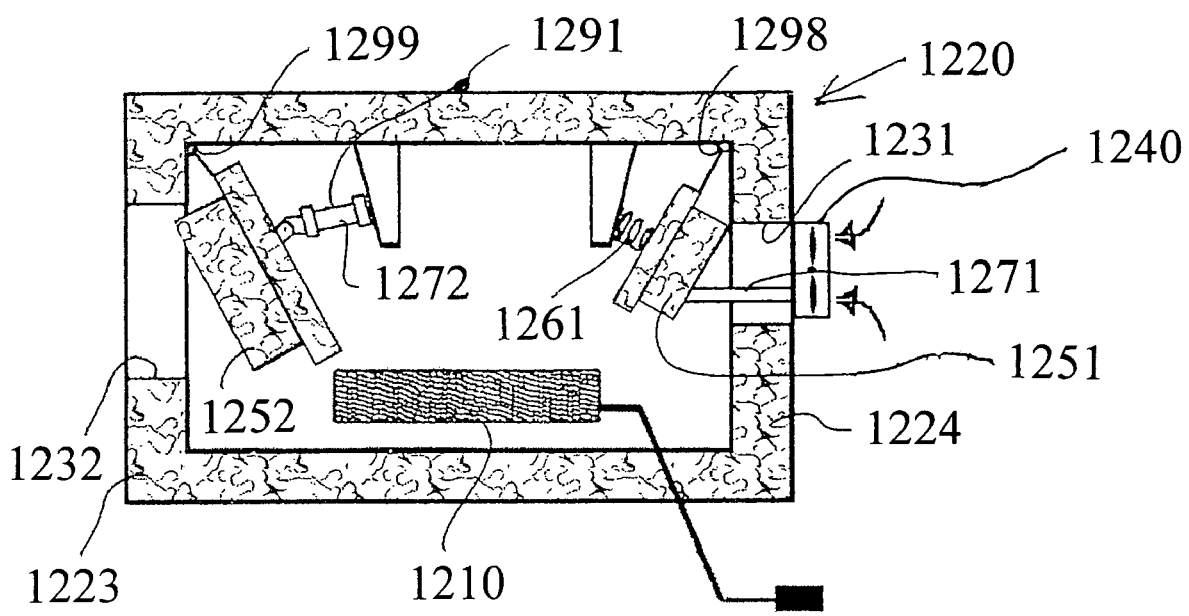
FIGS. 15A and 15B illustrate yet another embodiment wherein one hatch is held open by a meltable tab and a second hatch is actuated by a solenoid.
Figure 15B:
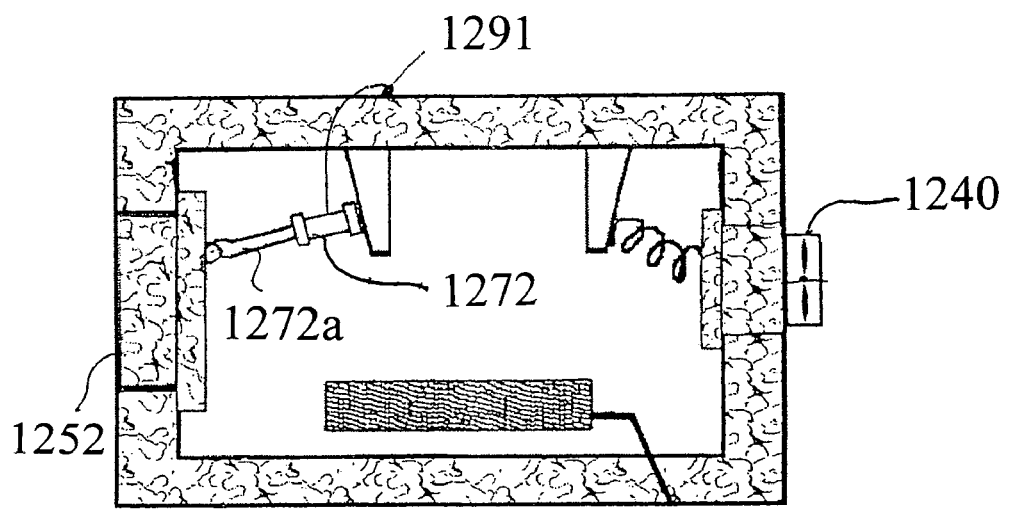

FIG. 15A illustrates a further embodiment wherein enclosure 1220 houses a single data storage device 1210. Side wall 1224 has a first passageway 1231 formed therein which forms an inlet passageway for fan 1240. A first hatch 1251 is hingedly mounted at pivot point 1298 and is held in its open position shown in FIG. 15A by meltable tab 1271. A second, exhaust passageway 1232 is formed in side wall 1223. A second hatch 1252 is hingedly mounted adjacent opening 1232 and is hinged at pivot point 1299. In this embodiment, when the threshold temperature is sensed, meltable element 1271 melts and allows first hatch 1251 to be closed by the expansion of spring 1261. The second hatch 1252 is closed by solenoid 1272 being activated by temperature sensor 1291 causing solenoid arm 1272a to extend, thereby closing hatch 1252.

Figure 16A:
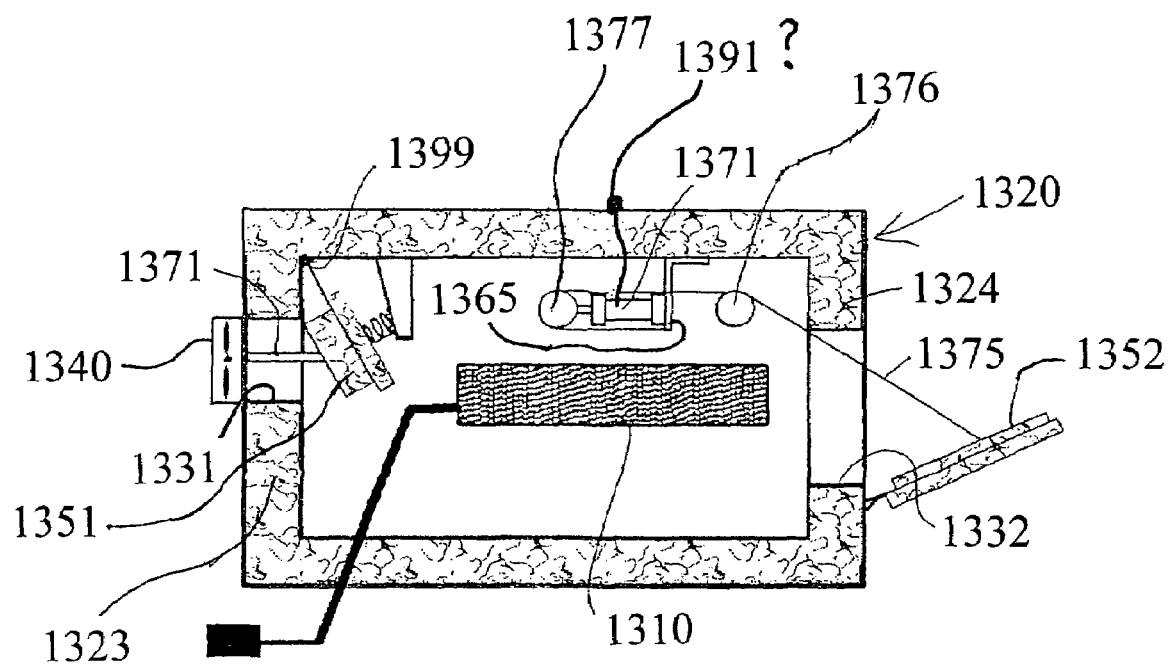
FIGS. 16A and 16B illustrate another embodiment wherein one hatch is held open by a meltable tab, and a second hatch is held in position by a cable and pulley mechanism wherein one of the pulleys is carried by a solenoid and the solenoid upon being activated extends the cable and closes one of the hatches.

FIG. 16A shows another embodiment wherein enclosure 1320 houses a single data storage device 1310. Side wall 1323 has a first opening 1331 formed therein. A first hatch 1351 is hingedly mounted adjacent inlet passageway 1331 and is hingedly mounted at pivot point 1399. Meltable tab 1371 holds hatch 1351 in its open position shown in FIG. 16A. A second hatch 1352 is shown pivotally mounted adjacent a second or exhaust passageway 1332 formed in side wall 1324. Hatch 1352 is held in its open position shown in FIG. 16A by a cable 1375 which extends over first pulley 1376. A second pulley 1377 is carried by solenoid 1371 and is attached to bracket 1365. Solenoid 1371 is connected to temperature sensor 1391.

Figure 16B:
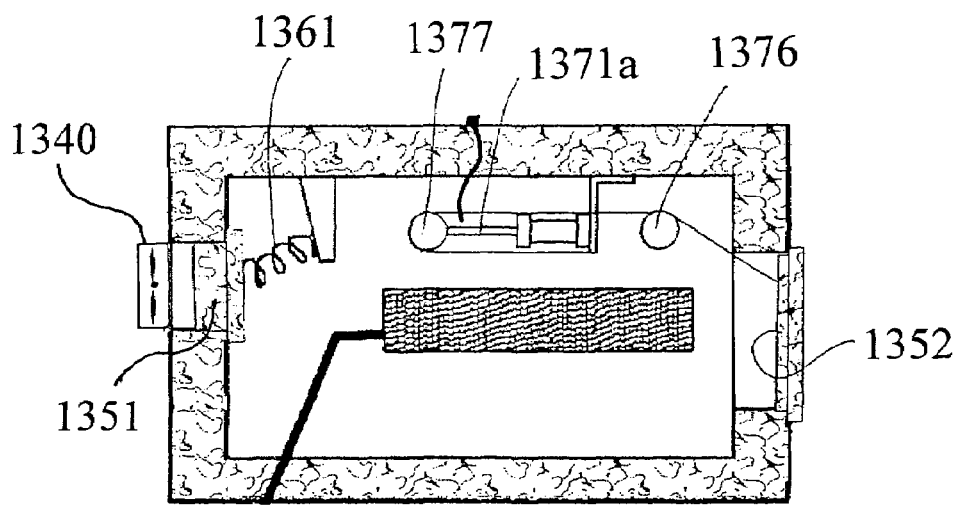

When a threshold temperature is reached, as shown in FIG. 16B, meltable tab 1371 melts allowing spring 1361 to close first hatch 1351. Solenoid 1371 moves from its retracted position shown in FIG. 16A to its extended position in FIG. 16B wherein the arm 1371a interacting with pulleys 1376 and 1377 causes hatch 1352 to close.

Figure 17A:
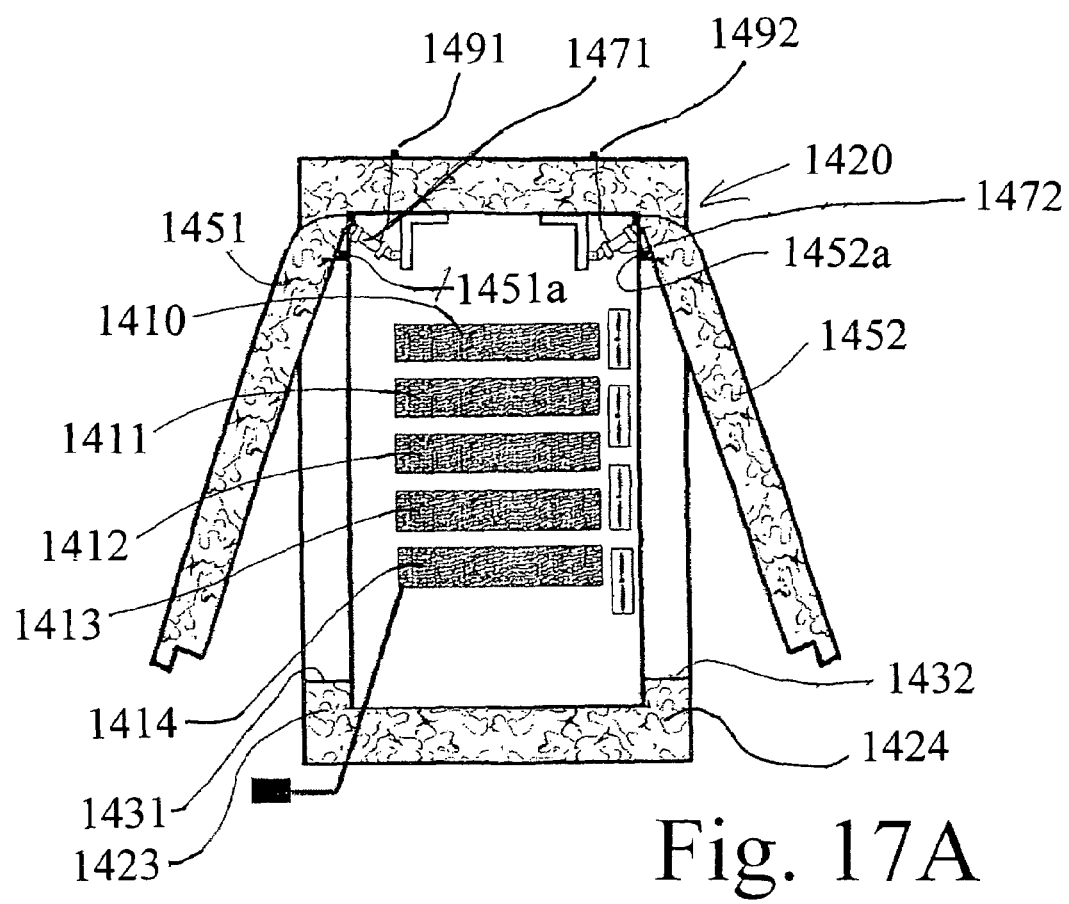
FIGS. 17A and 17B illustrate another embodiment wherein five data storage devices are contained within the enclosure and two relatively large hatches are actuated by solenoids.

FIG. 17A shows another embodiment wherein enclosure 1420 houses five data storage devices 1410–1414. Side wall 1423 has a first passageway 1431 formed therein and side wall 1424 has a second passageway 1432 formed therein. Movable hatches 1451 and 1452 are hingedly connected at 1451a and 1452a to side walls 1423 and 1424, respectively. Solenoids 1471 and 1472 hold hatches 1451 and 1452 in their open position shown in FIG. 17A. Temperature sensors 1491 and 1492 are connected to solenoids 1471 and 1472, respectively.

Figure 17B:
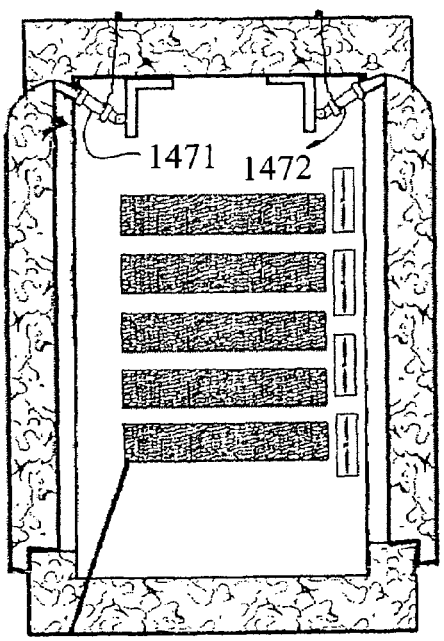

As shown in FIG. 17B, when the threshold temperature is sensed, solenoids 1471 and 1472 move to their retracted positions, thereby closing hatches 1451 and 1452.

Figure 18A:
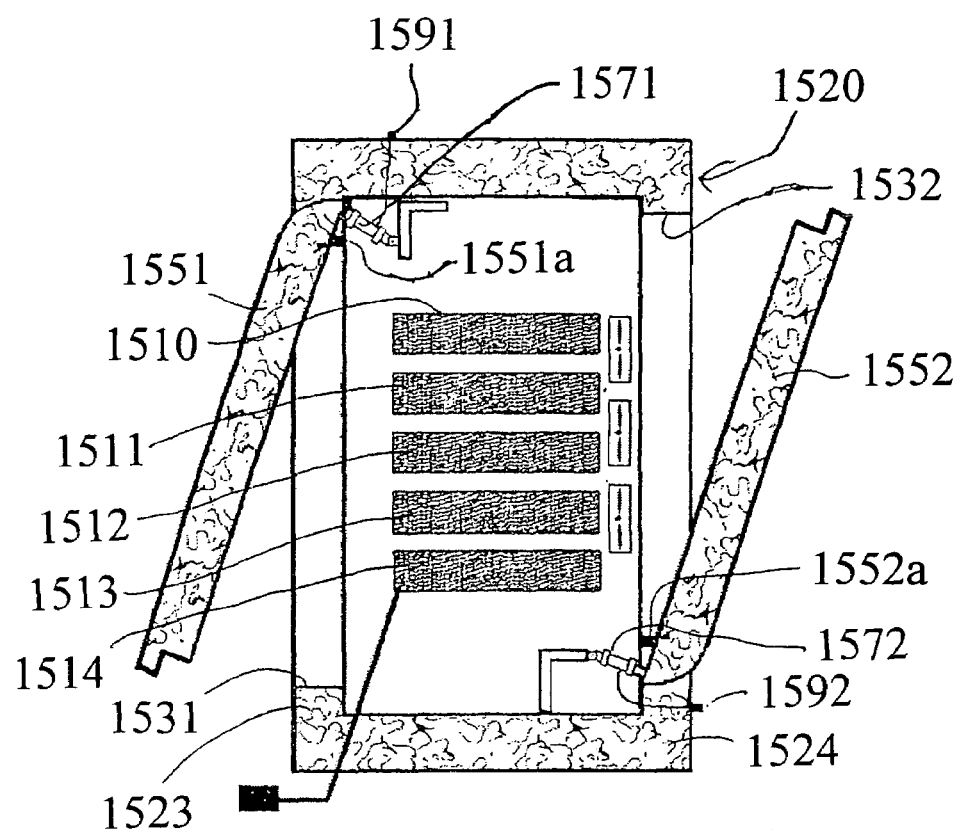
FIGS. 18A and 18B illustrate another embodiment wherein relatively large hatches are formed in two of the side walls and are actuated by solenoids.
Figure 18B:
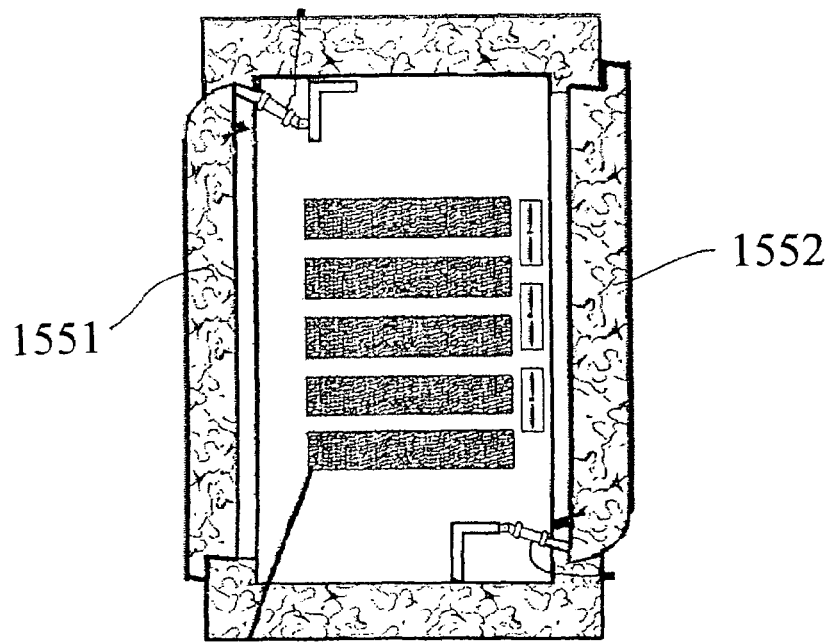

FIG. 18A shows an embodiment wherein enclosure 1520 houses five separate data storage devices 1510–1514. Side wall 1523 has a first passageway 1531 formed therein and side wall 1524 has a second passageway 1532 formed therein. A first hatch 1551 is hinged at point 1551a near the top of side wall 1523. Second hatch 1552 is hinged at point 1552a near the bottom of side wall 1524. Solenoids 1571 and 1572 hold hatches 1551 and 1552 in their open positions shown in FIG. 18A. When the temperature sensors 1591 and 1592 are exposed to a threshold temperature, they energize solenoids 1571 and 1572 causing those solenoid arms to extent and close hatches 1551 and 1552 as shown in FIG. 18B.

The embodiments shown in FIGS. 17A, 17B and 18A, 18B show that the hatches can be hinged near the uppermost portion of the side walls and extend outwardly as shown in FIG. 17A or can be hinged at opposite ends of the side walls to form parallel planes in their open position as shown in FIG. 18A.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. Apparatus for protecting an operable computer digital data storage device from damage or loss of data caused by fire, comprising:
   an operable digital data storage device,
   a fire resistant enclosure in which said operable digital data storage device is carried,
   an opening formed in said enclosure,
   a movable fire resistant hatch positioned adjacent said opening, said hatch movable between a closed position, in which said hatch closes said opening, and an open position wherein ambient air may pass through said opening,
   fan means for actively driving ambient air through said opening to cool said data storage device while said storage device operates and while such hatch is open, and
   hatch closure means for closing said fire resistant hatch automatically in the presence of a threshold temperature, said hatch closure means including a temperature sensitive element which normally causes said fire resistant hatch to stay open but which is activated in the presence of said threshold temperature and causes said fire resistant hatch to move to said closed position.

2. The apparatus of claim 1 further comprising a second opening in said enclosure and a second, movable fire resistant hatch positioned adjacent said second opening.

3. The apparatus of claim 1 wherein said movable hatch comprises:
   a body portion which slidably engages said opening in said closed position,
   a cap which is carried by said body, said cap being adapted to close against said enclosure in its closed position, and
   said temperature sensitive element comprises a plurality of planar tabs.

4. The apparatus of claim 3 wherein said temperature sensitive element, in the presence of fire, melts and forms a seal between said movable hatch and said enclosure.

5. The apparatus of claim 1 wherein said hatch closure means further comprises a spring connected to said hatch, said spring urging said hatch toward said closed position.

6. The apparatus of claim 1 wherein said hatch closure means includes a solenoid.

7. The apparatus of claim 1 wherein said hatch closure means comprises an evaporative material and an expandable bladder, said expandable bladder causing said hatch to close when said threshold temperature is sensed.

8. The apparatus of claim 1 wherein said hatch closure means comprises a shape memory metal member.

* * * * *